Oct. 22, 1968  R. L. VON KALER  3,406,592

DIFFERENTIAL

Filed Oct. 7, 1966

INVENTOR
ROLAND L. VON KALER
BY
Barnes, Kisselle, Raisch & Choate
ATTORNEYS

United States Patent Office

3,406,592
Patented Oct. 22, 1968

3,406,592
DIFFERENTIAL
Roland L. von Kaler, Tecumseh, Mich., assignor to Tecumseh Products Company, Tecumseh, Mich., a corporation of Michigan
Filed Oct. 7, 1966, Ser. No. 585,167
6 Claims. (Cl. 74—710)

This invention relates to a differential drive mechanism of the type used in vehicle drives, and more particularly to a differential adapted for small vehicles such as riding lawn mowers, golf carts and the like.

An object of the present invention is to provide a differential drive mechanism which is simple in construction, easy to service, economical to produce and which is resistant to wear and hence has a long operational life.

Other objects as well as the features and advantages of the present invention will become apparent from the following description taken in conjunction with the accompanying drawing wherein.

Figure 1:
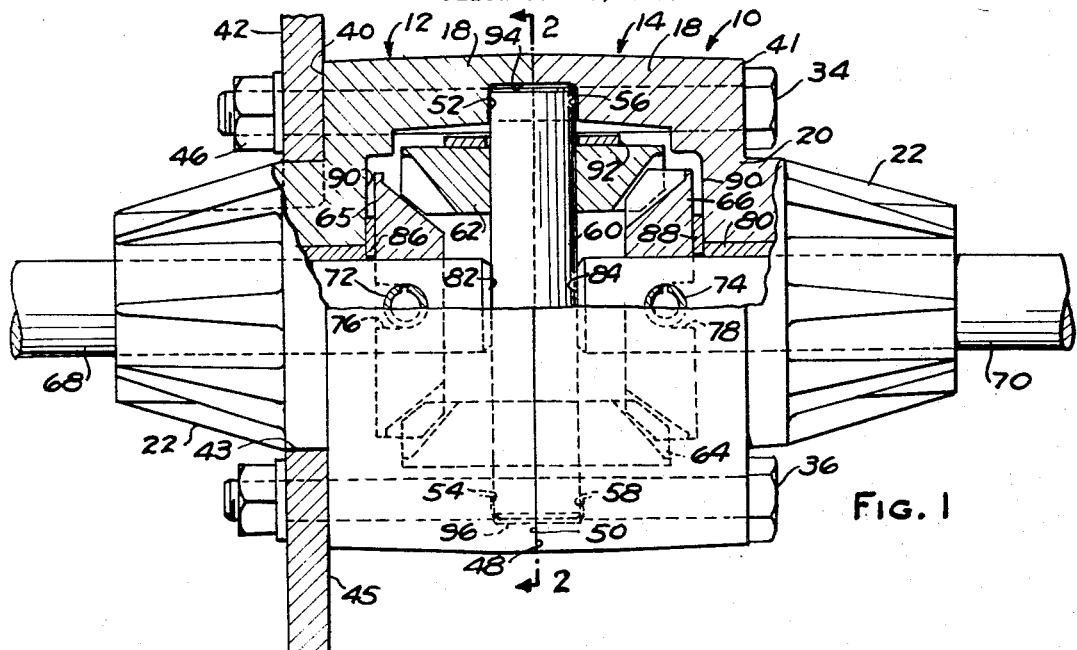
FIG. 1 is an elevational view of a preferred but exemplary differential drive unit constructed in accordance with the present invention, with the upper half of the unit shown in vertical center section.

Referring in more detail to the accompanying drawing, the differential drive unit 10 of the present invention comprises a carrier made up of two identical housing parts 12 and 14 which are preferably die cast from a structural aluminum alloy such as S.A.E. 380. Each of the housings 12 and 14 has a generally cup-like portion made up of a cylindrical portion 18 integrally joined to a radial wall portion 20, and a coaxial hub portion 22 integrally joined to wall portion 20. Each housing 12, 14 has four bolt holes 24, 26, 28 and 30 extending parallel to the axis of the housings from flat radial outer faces 40 and 41 of housings 12 and 14 respectively to flat radial inner faces 48 and 50 of housings 12 and 14. The bolt holes are arranged (FIG. 2) generally in diametrically opposite pairs in portions 18 of the housings and intersect the inner wall of portion 18 of each housing.

Four headed bolts 32, 34, 36 and 38, preferably made of hard, strong wear resistant material such as steel, are inserted one in each of holes 24–30 and are of a size to extend completely through both housings 12 and 14 (FIGS. 1 and 3) and to project sufficiently beyond the outer side face 40 of housing 12 so as to extend through an associated bolt hole in a cast iron or stamped steel sprocket 42. Sprocket 42 has a central aperture 43 which receives the hub portion 22 of housing 12, and an inner flat face 45 which abuts the outer face 40 of housing 12 in the mounted position of the sprocket. Alternatively, sprocket 42 can be mounted in like manner on housing 14. The threaded end of each bolt 32–38 projects beyond the outer face of sprocket 42 to receive a washer 44 and nut 46 thereon. In accordance with one feature of the present invention bolts 32–38 thus serve to clamp the two housings 12 and 14 together when their flat radial inner faces 48 and 50 are brought into abutment in assembled relation as shown in FIG. 1, as well as to secure sprocket 42 to the carrier.

Housing 12 is provided with a pair of diametrically opposite semi-cylindrical pockets 52 and 54 and housing 14 with like pockets 56 and 58 which in the assembled condition of the carrier together provide a pair of diametrically opposite cylindrical pockets for loosely receiving the associated opposite ends of a steel drive pin 60. In assembling housings 12 and 14, pin 60 may be laid in pockets 52 and 54 of housing 12 and then housing 14 laid against these parts and rotated until pin 60 seats in pockets 56 and 58, thereby angularly locating housings 12 and 14 in properly assembled relation.

Pin 60 carries a pair of bevel pinion gears 62 and 64 freely rotatable thereon which mesh with a pair of bevel side gears 65 and 66 which in turn are respectively mounted on the inner ends of a pair of coaxial axle shafts 68 and 70. Gears 65 and 66 are secured to shafts 68 and 70 for rotation therewith by any suitable means such as splines, mating flats on the axle shaft and hub of the gears or, as shown herein, by sleeve pins 72 and 74 which extend through radial holes in the axle shafts and project at their ends therefrom. The projecting ends of pins 72 and 74 are respectively received in diametrically extending recesses 76 and 78 formed in the back face of gears 64 and 66 respectively.

Each housing 12 and 14 has a bore extending coaxially through portions 20 and 22 thereof which is lined by a sintered bronze bushing 80 in which the associated axle shafts 68 and 70 are journaled for rotation. The inner, flat faced ends 82 and 84 of shafts 68 and 70 loosely abut pin 60 to thereby limit axial movement of the shafts toward one another. Movement of shafts 68 and 70 in the opposite direction is limited by pins 72 and 74 abutting thrust washers 86 and 88 disposed respectively between gears 65 and 66 and the adjacent interior flat faces 90 of the wall portion 20 of the housings 12 and 14.

Figure 2:
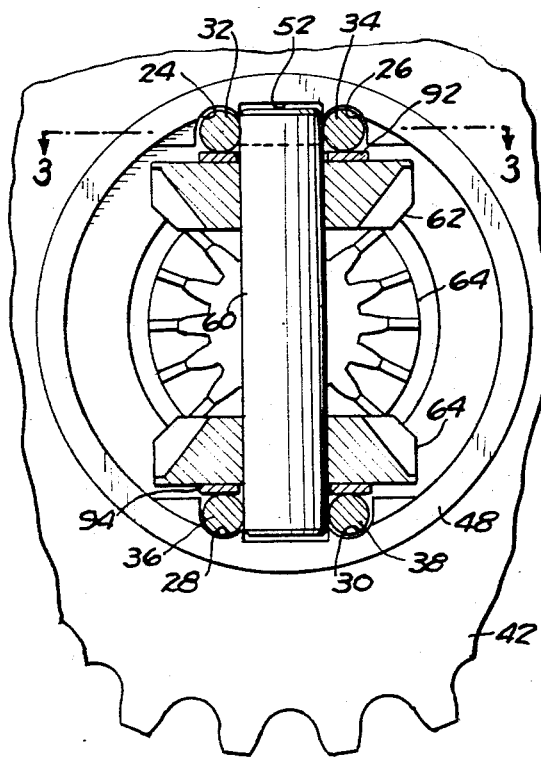
FIG. 2 is a fragmentary sectional view taken on the line 2—2 of FIG. 1.
Figure 3:
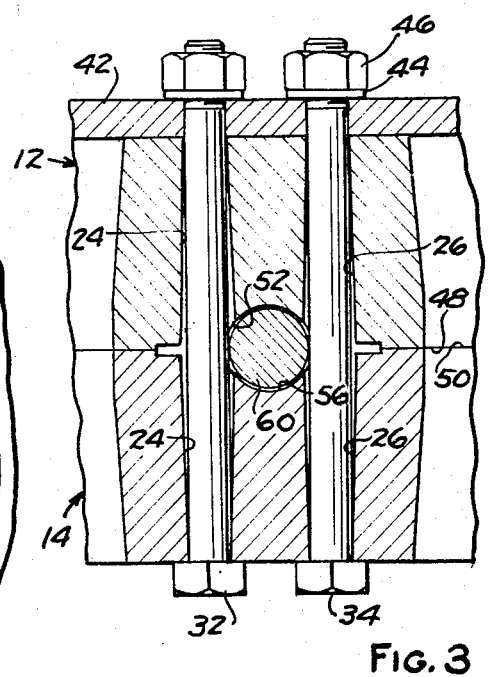
FIG. 3 is a fragmentary sectional view taken on the line 3—3 of FIG. 2.

Another feature of the present invention is the manner in which pinion gears 62 and 64 are retained on drive pin 60. As best seen in FIGS. 2 and 3, gears 62 and 64 are axially positioned on drive pin 60 against movement axially toward one another by their meshing engagement with the side gears 65 and 66. Gears 62 and 64 are respectively held against axial displacement in the opposite direction by thrust washers 92 and 94 which encircle pin 60 between the associated gears 62 and 64 and the adjacent pair of bolts 32, 34 and 36, 38.

In accordance with a further feature of the present invention, pocket 52–56 intersects bolt holes 24 and 26 (FIG. 3), and pocket 54–58 likewise intersects bolt holes 28 and 30 to expose one end of pin 60 to bolts 32 and 34 and the other end to bolts 36 and 38. The ends of pin 60 fit closely between the adjacent pair of bolts 32, 34 and 36, 38 so that the bolts maintain the ends of the pins centered in pockets 52–56 and 54–58 out of contact with the side walls of the housing pockets. Bolts 32–38 are thus adapted to transmit driving torque, imparted to sprocket 42 by a chain 100 (FIG. 1) trained therearound, directly from sprocket 42 to the closely interfitted intervening ends of drive pin 60. Hence housings 12 and 14 need not be constructed to withstand full driving torsional stress. Since rotational driving engagement occurs solely between steel bolts 32–38 and the steel pin 60, pin 60 is not driven by housings 12 and 14 and therefore it does not produce wear on the pocket surfaces of the housings. The axial end surfaces 94 and 96 of pockets 52–56 and 54–58 are normally spaced by a few thousandths of an inch from the flat end surfaces of pin 60, but surfaces 94 and 96 do serve as stops to limit axial movement of pin 60. However since pinions 62 and 64 are freely rotatable and freely slidable on pin 60, little or no axial thrust is exerted on pin 60 and it normally does not rotate on its axis. Therefore wear between the ends of pin 60 and surfaces 94, 96 is negligible.

Due to these features, housings 12 and 14 need not be made of high strength, wear resistant material, such as steel, but rather can be accurately die cast in finished form from inexpensive and lightweight material, such as aluminum alloy, thereby reducing the cost and weight of differential 10. Similar advantages accrue from the aforementioned pinion gear mounting feature wherein the steel bolts 32, 34 and 36, 38 serve as wear abutments and stops for the steel thrust washers 92 and 94, since here again the bolts and washer serve as wear surfaces and thus isolate the moving parts from the softer aluminum material of housings 12 and 14.

Except for the features noted above, the mode of operation of differential drive unit 10 is conventional and therefore no further description of its operation is believed necessary as such will be readily understood by those skilled in the art. From the foregoing description it will now be apparent that the differential drive mechanism constructed in accordance with the present invention provides an inexpensive and long lasting unit readily adapted for mass production and well suited for use in many drive train applications, and particularly as a differential for the rear axle of small vehicles such as riding lawn mowers, garden tractors and the like. It is to be understood that a gear, pulley or the like may be substituted for sprocket 42 in the event that it is desired to drive differential unit 10 with a drive train of some type other than a chain drive, such as a gear or belt drive.

I claim:

1. A differential mechanism comprising a rotatable housing, a pair of coaxial output shafts journaled in said housing coincident with the rotational axis thereof, first and second members extending through said housing parallel to the rotational axis thereof, drive means directly connected to said members for revolving said members with said housing about the rotational axis thereof in a given direction of rotation, said first member being disposed diametrically opposite from said second member in said housing, a drive pin disposed within said housing and extending perpendicular to the axis thereof between said output shafts with one end of said drive pin in driven engagement with said first member and the other end of said pin in driven engagement with said second member whereby said members transmit torque from said drive means to said pin, a pair of pinion gears rotatably mounted on said drive pin and a pair of side gears secured one on each of said output shafts and meshing with said pinion gears.

2. The combination set forth in claim 1 wherein said drive means comprises a circular drive element adapted to be mounted on said housing, and including fastening means including said members securing said drive element on said housing.

3. The combination set forth in claim 2 wherein each of said members of said fastening means comprises a headed steel bolt extending completely through said housing and said drive element and a nut threadably received on said bolt, with the nut and headed end of said bolt both exposed exteriorly of the assembly of said housing and drive element.

4. The combination set forth in claim 1 wherein said housing comprises two identical aluminum die castings having a hub section and an integral cup-like section with a flat radial inner face and a flat radial outer face at the junction of the cup-like section and hub section, said drive means comprising a circular drive element having a central aperture with a hub section of one of said castings received therein and a flat face abutting the outer face of one of said castings, said members each comprising a fastener having a steel shank extending through both of said castings and said circular element and serving to clamp said castings together with said inner faces in abutment and to secure said circular element against said one casting.

5. The combination set forth in claim 1 further including third and fourth members extending through said housing parallel to said first and second members and being laterally spaced from said first and second members respectively, said third and fourth members being directly connected to said drive means and in driving engagement with said one and other ends of said drive pin respectively on the sides thereof opposite said first and second members for transmitting torque from said drive means to said pin in a direction of rotation opposite to said given direction of rotation.

6. The combination set forth in claim 5 wherein said pinion gears are freely rotatable and slidable on said drive pin and are restrained against axial movement on said pin toward one another by their meshing engagement with said side gears, and including first and second thrust washers loosely received on said drive pin one intermediate one of said pinion gears and said first and third members and the other intermediate the other one of said pinion gears and said second and fourth members whereby said first and third members serve as stops for said first thrust washer and said second and fourth members serve as stops for said second thrust washer to limit axial movement of said pinion gears away from one another on said drive pin.

References Cited

UNITED STATES PATENTS

| | | | |
|---|---|---|---|
| 685,321 | 10/1901 | Billings | 74—713 |
| 696,704 | 4/1902 | Allen | 74—713 |
| 753,022 | 2/1904 | White | 74—713 |
| 805,740 | 11/1905 | Lowe | 74—713 |
| 1,279,670 | 9/1918 | Denning | 74—713 |
| 1,472,441 | 10/1923 | Sherbondy | 74—713 |
| 1,616,627 | 2/1927 | Hunt | 74—713 |
| 1,987,716 | 1/1935 | Skelton | 74—713 |

FRED C. MATTERN, JR., *Primary Examiner.*

THOMAS C. PERRY, *Assistant Examiner.*